United States Patent [19]
Duke

[11] 3,724,320
[45] Apr. 3, 1973

[54] HYDROSTATIC SHOCK OPERATED, FAST CLOSING VALVE AND SABOT

[75] Inventor: Buford W. Duke, Manchester, Tenn.

[73] Assignee: The United States of America as represented by the Secretary of the Air Force

[22] Filed: Nov. 15, 1971

[21] Appl. No.: 198,579

[52] U.S. Cl. ...................89/1 R, 89/14 SB, 102/93
[51] Int. Cl. ..........................................F41f 1/00
[58] Field of Search............89/1, 14; 14 SB; 102/93; 73/167

[56] References Cited

UNITED STATES PATENTS 1,416,827   5/1922   Holmes..............................89/14 SB
3,340,769   9/1967   Waser................................89/14 SB Primary Examiner—Samuel W. Engle
Attorney—Harry A. Herbert, Jr. et al.

[57] ABSTRACT

A hypervelocity gun range-valve and sabot-trap mechanism consisting of a thin-walled tube having an opening in the range-flight path and communicating with an instrumented test section, and a liquid-filled tube disposed normal to the flight path and surrounding the thin-walled tube for blocking the segments of the segmented sabot portion of a projectile consisting of a combined test model and sabot being fired from the gun tube. On impact of the projectile with the liquid-filled tube, the sabot completes separation from the model and creates a hydrostatic force in the liquid-filled tube that acts against, and collapses and closes a portion of, and therefore the opening in, the thin-walled tube to prevent contaminants from following the model into the test section of the range.

9 Claims, 8 Drawing Figures

PATENTED APR 3 1973 3,724,320

INVENTOR
BUFORD W. DUKE

BY
Harry A. Herbert Jr
ATTORNEY
Arthur R. Parker
AGENT 3,724,320

HYDROSTATIC SHOCK OPERATED, FAST CLOSING VALVE AND SABOT

BACKGROUND OF THE INVENTION

This invention relates generally to ballistic gunnery ranges and, in particular, to the field of reentry, aerodynamic, impact and aerophysics testing of projectiles fired from hypervelocity gun systems.

In the testing of hypervelocity vehicles, such as for example, reentry bodies associated with the space program, and intercontinental ballistic missiles and antiballistic missiles, various types of hypervelocity gun ranges have been, and are being employed. Such ranges have typically included both a blast tank section, and an instrumented test section for the recording of essential flight data. The projectiles used during such testing have consisted of the test model itself and a device for supporting the test model in the hypervelocity gun tube, which device is known as a sabot. The latter may be fabricated into a plurality of segments that automatically separate from the test model, after the initially combined model and sabot have been fired from the gun tube. Naturally, some means must be employed in an effort to prevent the segmental fragments of the sabot from passing into, and thereby contaminating the instrumented test section of the gun range. Also, the muzzle blast will likewise be prevented from contaminating the test section. Heretofor, one method of an attempt to avoid such contamination has been to make the port or opening between the blast tank section and the instrumented test section as small as the model size and inherent trajectory dispersion will permit. Of course, this technique offers some degree of success. However, the present invention was developed to further substantially reduce, if not entirely eliminate, contamination of the range test section, in the unique and yet simplified manner to be hereinafter described in the following summary and detailed description thereof.

SUMMARY OF THE INVENTION

The present invention consists briefly in a combined fast acting valve-and-sabot trap mechanism positioned in the flight path of a hypervelocity gun range immediately uprange from the instrumented test section. This combined mechanism may consist preferably of a rubber, liquid-filled torus which is oriented normal to the flight path and is disposed in surrounding and contacting relation with a thin-walled tube having an opening in axial alignment with the flight path and in communication with the instrumented test section of the range. A projectile including the test model and a supporting sabot, consisting, in one form thereof, of four segments held together in supporting relation with the test model by the walls of the gun tube, may be fired from the hypervelocity gun. On leaving the gun muzzle at high velocity, the segments comprising the sabot are forced radially outward away from the model by the creation of aerodynamic forces. Thereafter, impact of these sabot segments against the liquid-filled torus occurs, and a hydrostatic pressure is created in the liquid and transferred therethrough for application against the thin-walled tube. The time delay required for this transfer of hydrostatic pressure allows the fired test model-projectile to continue in its flight path to the range test section through the opening provided therefor in the thin-walled tube. Immediately thereafter, the hydrostatic pressure created by the impact of the sabot-segments against the liquid-filled torus collapses and blocks a portion of the thin-walled tube and the opening therein to thereby prevent contamination of the range test section.

Other objects and advantages of the present invention will become readily apparent from the following disclosure thereof, taken in connection with the accompanying drawings, in which;

DESCRIPTION OF THE PREFERRED EMBODIMENT

Figure 1:
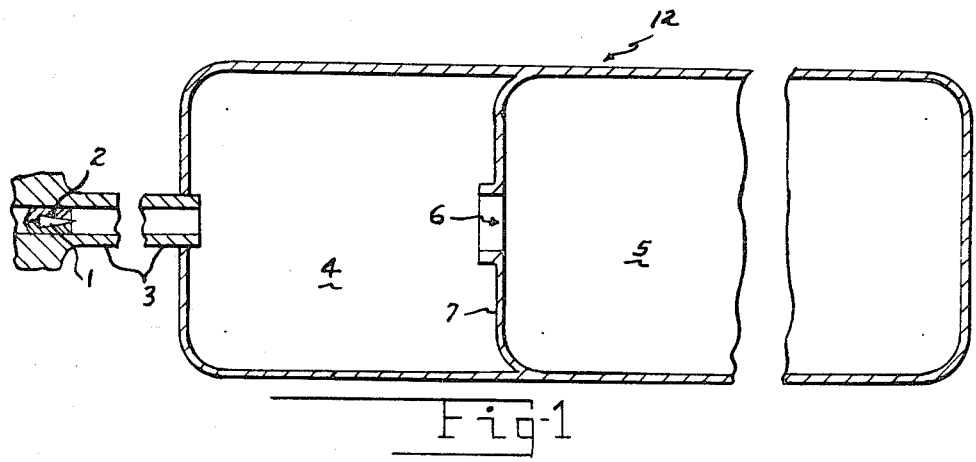
FIG. 1 is an overall schematic and sectional view, partly broken-away, of a typical ballistic range with which the improvement of the present invention may be utilized.

Referring generally to the drawings and, in particular, to FIG. 1 thereof, a conventional-type or typical ballistic range to which the present invention may be applied is indicated generally and schematically at 12 as consisting principally of a hypervelocity gun launcher tube at 3, a blast tank section at 4 and an instrumented test range section at 5 where data are taken. A test model 1 and a sabot 2 are shown disposed and supported in firing position within the gun launcher 3. In operating the aforementioned typical ballistic range 12, the test model 1, supported by the sabot 2 is fired or projected by the gun launcher tube 3 through the blast tank section 4 into the instrumented test range section 5. An opening or communicating passageway at 6 is formed in the bulkhead at 7 that may be supported, for example, to the top of the blast tank section 4, provides the opening between the aforementioned blast tank section 4 and the instrumented test range section 5 through which the test model 1 passes on its way downrange. As hereinbefore noted, the communicating passageway 6 is conventionally made as small as is feasible to reduce contamination of the instrumented test range section 5 from launcher gases and debris.

Figures 2, 2A:
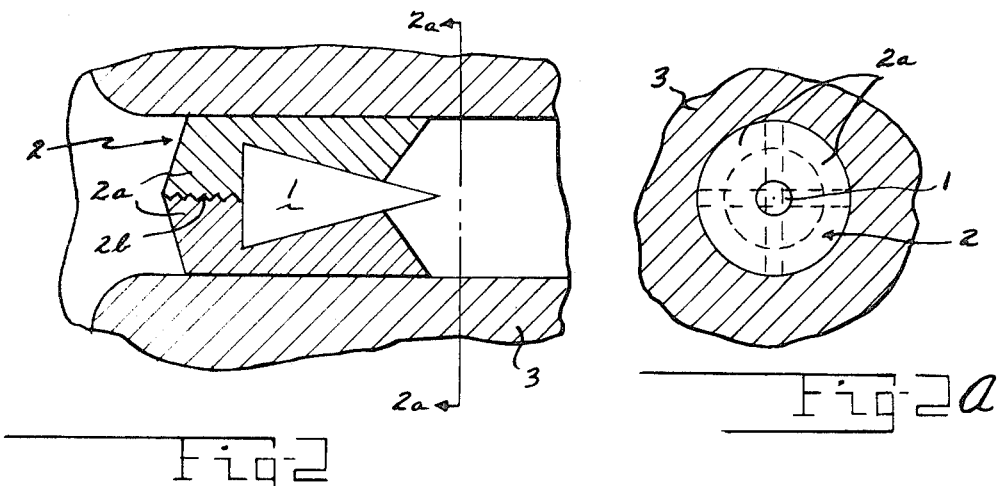
FIG. 2 is another sectional view, in side elevation and partly broken-away, illustrating details of the combined test model and sabot support used and combined with the unique valve and sabot trap of the present invention.
FIG. 2a represents another partly broken-away and cross-sectional view, taken about on line 2a—2a of FIG. 2, illustrating additional details of the sabot support of FIG. 2.

Referring specifically to FIG. 2, it is seen clearly that the sabot 2 actually may consist of, and incorporate a plurality of sabot-segments at 2a which, in one form thereof, may total four in number as is seen more particularly in FIG. 2a. The test model 1 is placed in a cavity collectively machined for that purpose in the sabot-segments 2a. The sabot 2, which may be of a plastic material and cylindrical in configuration, holds and protects the test model 1 in the launcher tube 3 at the desired launch attitude. The segments 2a, in this case four as hereinbefore noted, are prevented from moving relative to each other, while in the launcher tube 3, by means of the saw-toothed serrations, indicated generally at 2b in FIG. 2, machined in the mating surfaces of the said sabot-segments 2a. Of course, the entire model-sabot assembly is held together by the bore of the launcher 3.

Figure 3:
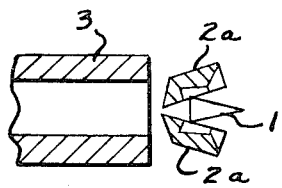
FIG. 3 is still another partly broken-away and schematic view, in fragmentary and sectional form, representing the condition of the combined test model-and-sabot assembly of the present invention, immediately after the firing thereof from the gun tube.
Figure 4:
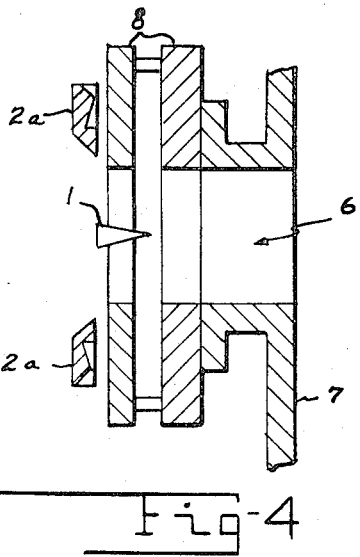
FIG. 4 represents an additional partly broken-away, sectional and schematic view, illustrating the relationship between the separated test model and sabot assembly of FIG. 3, just prior to the impact of the sabot fragments with a conventional sabot stop device.

In normal practice, on firing the hypervelocity gun system, the combined model-and-sabot assembly emerges from the muzzle of the launcher tube 3 at high velocity. Aerodynamic forces acting on the properly shaped forward surfaces of the sabot-segments 2a force the latter to move radially outward away and separating from the test model 1 and the model flight path, as is specifically shown in FIG. 3. In this connection, the pressure in the blast tank section 4 may be adjusted in a well-known manner, the specific nature of which not being part of the present invention, to thereby provide control of the adjustment of the aforementioned radial movement of the segments 2a to the amount of travel required, for example, for them to properly impact against a previously-developed sabot stop structure, such as that indicated generally at 8 in FIG. 4, for example, which may be mounted to the aforementioned bulkhead 7 and also incorporate an opening or passageway in direct alignment with the first-named passageway 6, as is clearly illustrated in the latter figure. This impact of the sabot-segments 2a occurs while the test model 1 proceeds on through the passageway 6 into the instrumented test range section 5 (FIG. 1). Said sabot-segments 2a and a portion of the sabot stop structure 8 are vaporized on impact to thereby create contaminants which, along with the launcher propellant gases, enter the test range section 5 through the bulkhead passageway 6.

Figure 5A:
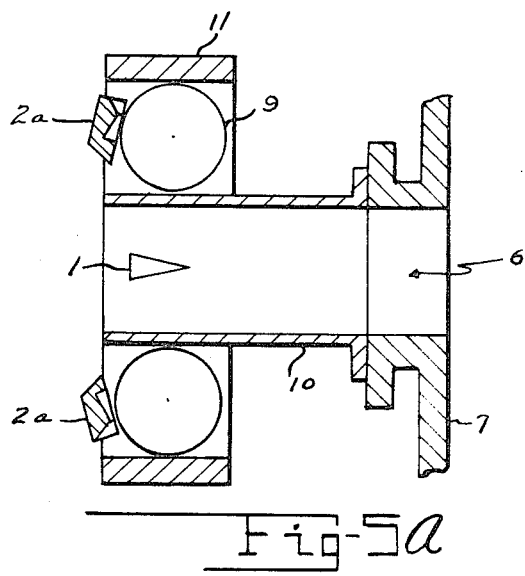
FIGS. 5a, 5b and 5c are further schematic, partly broken-away and sectional views respectively illustrating progressive steps in the application of the improved, fast acting valve and sabot trap mechanism of the present invention.
Figure 5B:
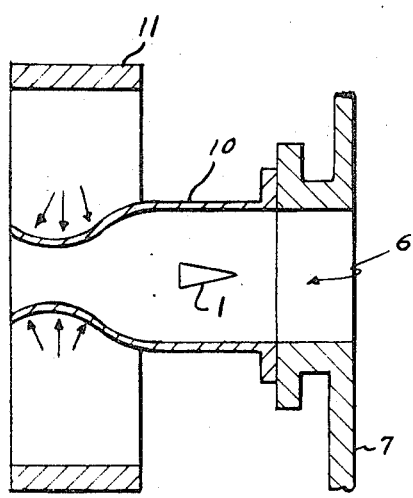
Figure 5C:
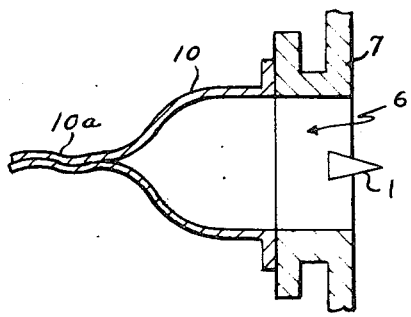

To avoid the passage of contaminants through the aforementioned passageway 6, the present invention uniquely improves the ballistic range 12 of FIG. 1 by replacing the aforementioned conventional sabot stop structure 8 (FIG. 4) with the novel arrangement of the present invention, shown in detail in FIGS. 5a, 5b and 5c. In FIG. 5a, for example, the previously described passageway 6 is again depicted as being incorporated in the bulkhead 7. The new, combined fast acting valve and sabot trap mechanism constituting the improvement of the present invention, and which is to replace the aforesaid conventional sabot stop structure 8, is illustrated as including a thin-wall, center tube, indicated at 10 as being mounted on, and extending uprange of the bulkhead 7 in direct and axial alignment with the flight path of the test model 1. In effect, center tube 10 constitutes a second passageway that is interconnected and in normally-open, communication with passageway 6. Therefore, the said thin-wall, center tube 10 and the remaining structure constituting the present invention to be hereinafter further described are mounted between the blast tank section 4 and the instrumented test range section 5. Uniquely placed in surrounding relation to said thin-wall, center tube 10 is an energy absorbing-sabot trap device preferably consisting of a liquid-filled, rubber torus, indicated at 9, that may be supported in a position in contact with said thin-wall tube 10 and normal to the model-flight path by means of an outside retainer ring at 11. With the use of this novel system, as the sabot-segments, again shown at 2a in FIG. 5a and which have been previously projected or fired from the launcher tube 3, strike the rubber torus 9, a pressure pulse or hydrostatic shock is created in the liquid contained therewithin, which hydrostatic shock subsequently becomes operative, in accordance with the novel teachings of the present invention, to act against, and collapse the center tube 10. Initially, however, the time required for the said hydrostatic shock to traverse the liquid contained within the rubber torus 9 is sufficient to allow the test model 1 to proceed through, or substantially through the center tube 10. Thus, as is seen particularly in FIG. 5b, although the aforementioned pressure pulse or hydrostatic shock has become operative to cause the beginning of some collapsing of the center tube 10; nevertheless, the test model 1 has had adequate time, as shown, to pass further downrange of the collapsing area of the tube 10 and, in fact, is now approaching the passageway 6 for its entry into the instrumented test range section 5 (FIG. 1). Immediately thereafter, the previously described hydrostatic shock, which has been developed by the unique means of the present invention, has become further operative to achieve the final and complete collapse of a portion of the center tube 10 and, of course, the passageway formed thereat, as is indicated generally at the reference numeral 10a in FIG. 5c. In this connection, it is noted that the retainer ring 11 is made sufficiently strong that it is not damaged by the sabot impact.

In testing the inventive concept, the rubber torus 9 actually consisted of a water-filled aircraft tire-inner tube, and the collapsible thin-wall, center tube 10 was made from a 5.00 inch outside diameter by 0.064 inch wall low carbon steel tubing. In operation, the liquid filled torus 9 and the sabot-segments 2a are completely destroyed and the liquid (water) is vaporized by the sabot impact. The center tube 10 is collapsed over a length of approximately 1 foot and effectively seals the blast tank section 4 from the instrumented test range section 5. The energy required to collapse the tube 10 is estimated to be less than one half of one percent of the total energy available in the average firing of the launcher 3. The balance of this energy is dissipated, vaporizing the sabot-segments 2a and the liquid (water) contained in the torus 9.

Although the improved sabot trap and fast acting valve mechanism hereinbefore set forth has been described in connection with a specific arrangement that includes a liquid-filled tube surrounding a thin-wall tube which is designed to collapse under the pressure of the energy absorbed from the impacting sabot segments and transferred by the liquid-filled tube, it is to be understood that the present concept is broad enough to be embodied in numerous other modifications without departing from the true spirit and/or scope of the invention, as delineated hereinafter in the following claims.

I claim:

1. A ballistic range having both blast tank and instrumented test range sections; a hypervelocity gun-launcher tube having a muzzle end portion partially extending into said blast tank-range section and adapted to contain a projectile comprised of a missile or test model and a supporting sabot structure incorporating a plurality of aerodynamically shaped, sabot-segments initially mounted within, and enclosing and retaining said missile or test model in the correct launching attitude in the launcher tube-bore and subsequently separating from said missile or test model in a radially outward direction away from the model-flight path by the action of aerodynamic forces thereon during its initial launch into the blast tank section; first, communicating and normally open passage means interposed between said blast tank, and instrumented test range sections and axially aligned with the flight path of the missile or model, said first, communicating passage means being of a predetermined restricted size tending to limit contamination of the instrumented test range section from propellant gases and debris following the flight of the missile or test model thereinto; and a combined sabot trap and fast acting valve mechanism for preventing contaminants from reaching the instrumented test range section and including a second, communicating passage means interconnected and in normally open communication with said first, communicating passage means and extending further uprange therefrom in axial alignment with the missile or model-flight path for initially receiving and passing therethrough the said missile or test model after its firing from the launcher tube and separation from the sabot-segments in the blast tank section, and a sabot trap-energy absorbing and transferring means incorporating a first, resilient and expandable inner portion in contacting relation with, and movable between a first, inoperative and non-expanded position and a second, operative and expanded position effective to completely block a portion of said second, communicating passage means, said first, resilient and expandable portion being further disposed directly in the path of the said sabot-segments to thereby ensure the impact of the latter therewith, and a second, rigid, outer portion supporting and restraining said first, resilient portion for movement and expansion to the said second position in an inward direction only, under the effect of the energy being absorbed from the impacting sabot-segments, to thereby act against, and ensure the blocking of a portion of the second, communicating passage means in operative, contacting relation therewith and thus prevent contaminants from following the missile or test model through said passage means.

2. In a ballistic range as in claim 1, wherein said second, communicating passage means comprises a thin-wall tube.

3. In a ballistic range as in claim 1, wherein said second, communicating passage means comprises a collapsible tube.

4. In a ballistic range as in claim 1, wherein said second, communicating passage means comprises a collapsible thin-wall tube.

5. In a ballistic range as in claim 1, wherein the first, resilient and expandable inner portion of said sabot trap-energy absorbing and transferring means comprises a hollow member filled with a liquid.

6. In a ballistic range as in claim 5, wherein said hollow member comprises a rubber tube.

7. In a ballistic range as in claim 5, wherein said hollow member comprises a liquid-filled rubber torus.

8. In a ballistic range as in claim 5, wherein said hollow member comprises a liquid-filled inner tube.

9. In a ballistic range as in claim 3, wherein the first, resilient and expandable inner portion of said sabot trap-energy absorbing and transferring means comprises a pair of liquid-filled balloons disposed in circumferential and contacting relation with said collapsible tube.

* * * * *